(12) United States Patent
Kwak

(10) Patent No.: US 12,058,403 B2
(45) Date of Patent: Aug. 6, 2024

(54) ELECTRONIC APPARATUS AND CONTROL METHOD THEREOF

(71) Applicant: SAMSUNG ELECTRONICS CO., LTD., Suwon-si (KR)

(72) Inventor: Jongwon Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/832,822

(22) Filed: Jun. 6, 2022

(65) Prior Publication Data

US 2022/0303610 A1 Sep. 22, 2022

Related U.S. Application Data

(63) Continuation of application No. PCT/KR2022/003657, filed on Mar. 16, 2022.

(30) Foreign Application Priority Data

Mar. 16, 2021 (KR) ........................ 10-2021-0034156

(51) Int. Cl.
*H04N 21/435* (2011.01)
*H04N 21/438* (2011.01)
*H04N 21/84* (2011.01)

(52) U.S. Cl.
CPC ....... *H04N 21/435* (2013.01); *H04N 21/4383* (2013.01); *H04N 21/84* (2013.01)

(58) Field of Classification Search
CPC .. H04N 21/482; H04N 21/4828; H04N 21/84; H04N 21/435; H04N 21/4583; H04N 21/47
See application file for complete search history.

(56) References Cited

U.S. PATENT DOCUMENTS 8,091,105 B2   1/2012 Lee
8,225,354 B2 * 7/2012 Acton ................ H04N 21/4345
                                                                  725/50
(Continued)

FOREIGN PATENT DOCUMENTS

JP    2001-186497 A    7/2001
JP    2016-134656      7/2016
(Continued)

OTHER PUBLICATIONS

PCT/ISA/210 dated Jun. 10, 2022 in International Patent Application No. PCT/KR2022/003657 (3 pages; 3 pages English translation).

(Continued)

*Primary Examiner* — Jason Salce
(74) *Attorney, Agent, or Firm* — STAAS & HALSEY LLP

(57) ABSTRACT

An electronic apparatus includes a communication interface, a broadcasting signal receiver to receive a broadcasting signal, and a processor configured to receive first broadcasting schedule information including channel names and broadcasting program information for a plurality of first broadcasting channels from a server through the communication interface, obtain second broadcasting schedule information including channel names and broadcasting program information for a plurality of second broadcasting channels from the broadcasting signal, match the plurality of first broadcasting channels with the plurality of second broadcasting channels, and generate a channel matching table by matching the plurality of first broadcasting channels with the plurality of second broadcasting channels by comparing at least one of the channel names or the broadcasting program information included in the first broadcasting schedule information with at least one of the channel names or the (Continued)

broadcasting program information included in the second broadcasting schedule information.

13 Claims, 10 Drawing Sheets

(56) References Cited

U.S. PATENT DOCUMENTS

| | | | |
|---|---|---|---|
| 9,681,187 B2 | 6/2017 | Jeong et al. | |
| 10,841,656 B2 | 11/2020 | Baek et al. | |
| 2002/0157099 A1* | 10/2002 | Schrader | H04N 21/2665 |
| | | | 725/51 |
| 2002/0157101 A1* | 10/2002 | Schrader | H04N 21/8586 |
| | | | 348/E7.063 |
| 2003/0051246 A1* | 3/2003 | Wilder | H04N 7/17318 |
| | | | 348/E7.071 |
| 2005/0125844 A1* | 6/2005 | Maruyama | H04N 21/454 |
| | | | 725/135 |
| 2005/0193415 A1* | 9/2005 | Ikeda | H04N 21/4586 |
| | | | 725/50 |
| 2006/0282857 A1* | 12/2006 | Kim | H04N 21/482 |
| | | | 725/62 |
| 2007/0050382 A1* | 3/2007 | Bugir | H04N 21/854 |
| 2007/0288960 A1* | 12/2007 | Akiyama | H04N 21/4622 |
| | | | 725/40 |
| 2009/0260038 A1* | 10/2009 | Acton | H04N 21/482 |
| | | | 725/49 |
| 2009/0293089 A1* | 11/2009 | Taylor | H04N 21/4821 |
| | | | 725/53 |
| 2013/0219435 A1 | 8/2013 | Pattison et al. | |
| 2015/0373411 A1 | 12/2015 | Jeong et al. | |
| 2016/0212489 A1 | 7/2016 | Suzuki | |
| 2016/0227274 A1 | 8/2016 | Oh et al. | |
| 2016/0301976 A1* | 10/2016 | Seo | H04N 21/4854 |
| 2019/0208244 A1 | 7/2019 | Choi et al. | |
| 2019/0349638 A1 | 11/2019 | Baek et al. | |
| 2020/0112764 A1 | 4/2020 | Choi et al. | |

FOREIGN PATENT DOCUMENTS

| | | |
|---|---|---|
| KR | 1999-0050605 A | 7/1999 |
| KR | 10-1424975 B1 | 7/2014 |
| KR | 10-2015-0051770 | 5/2015 |
| KR | 10-2016-0000387 | 1/2016 |
| KR | 10-1869222 | 7/2018 |
| KR | 10-2019-0083552 | 7/2019 |
| KR | 10-2019-0129586 | 11/2019 |
| KR | 10-2056166 B1 | 12/2019 |
| KR | 10-2020-0131559 | 11/2020 |

OTHER PUBLICATIONS

PCT/ISA/237 dated Jun. 10, 2022 in International Patent Application No. PCT/KR2022/003657 (4 pages; 4 pages English Translation).

Extended European search report dated Feb. 19, 2024 for patent application 22771751.9.

* cited by examiner

FIG. 5

| FIRST BROADCASTING CHANNEL | | CHANNEL IDENTIFIER | CHANNEL NAME | BROADCASTING PROGRAM INFORMATION | |
|---|---|---|---|---|---|
| FIRST BROADCASTING SCHEDULE INFORMATION | 1-1 | onid: 1, tsid: 30, sid: 40 | CHANNEL A | PM 7:00 PROGRAM 1 | PM 8:00 PROGRAM 2 |
| | 1-2 | – | 채널 비 | PM 7:00 PROGRAM 3 | ⋯ |
| | 1-3 | onid: 1, tsid: 30, sid: 41 | C CHANNEL | PM 7:00 PROGRAM 4 | PM 8:00 PROGRAM 5 |

| SECOND BROADCASTING CHANNEL | | CHANNEL IDENTIFIER | CHANNEL NAME | BROADCASTING PROGRAM INFORMATION | |
|---|---|---|---|---|---|
| SECOND BROADCASTING SCHEDULE INFORMATION | 2-1 | onid: 1, tsid: 30, sid: 40 | CHANNEL A | PM 7:00 PROGRAM 1 | PM 8:00 PROGRAM 2 |
| | 2-2 | onid: 1, tsid: 31, sid: 40 | CHANNEL B | PM 7:00 PROGRAM 3 | ⋯ |
| | 2-3 | onid: 1, tsid: 32, sid: 40 | CHANNEL C | PM 7:00 PROGRAM 4 | PM 8:00 PROGRAM 5 |

FIG. 6

FIRST BROADCASTING CHANNEL

| | CHANNEL IDENTIFIER | CHANNEL NAME | BROADCASTING PROGRAM INFORMATION | |
|---|---|---|---|---|
| 1-1 | onid: 1, tsid: 30, sid: 40 | CHANNEL A | PM 7:00 PROGRAM 1 | PM 8:00 PROGRAM 2 | ... |
| 1-2 | - | 채널 비 | PM 7:00 PROGRAM 3 | ... |
| 1-3 | onid: 1, tsid: 30, sid: 41 | C CHANNEL | PM 7:00 PROGRAM 4 | PM 8:00 PROGRAM 5 | ... |

FIRST BROADCASTING SCHEDULE INFORMATION

SECOND BROADCASTING CHANNEL

| | CHANNEL IDENTIFIER | CHANNEL NAME | BROADCASTING PROGRAM INFORMATION | |
|---|---|---|---|---|
| 2-1 | onid: 1, tsid: 30, sid: 40 | CHANNEL A | PM 7:00 PROGRAM 1 | PM 8:00 PROGRAM 2 | ... |
| 2-2 | onid: 1, tsid: 31, sid: 40 | CHANNEL B | PM 7:00 PROGRAM 3 | ... |
| 2-3 | onid: 1, tsid: 32, sid: 40 | CHANNEL C | PM 7:00 PROGRAM 4 | PM 8:00 PROGRAM 5 | ... |

SECOND BROADCASTING SCHEDULE INFORMATION

FIG. 7

FIRST BROADCASTING CHANNEL

| | | CHANNEL IDENTIFIER | CHANNEL NAME | BROADCASTING PROGRAM INFORMATION | |
|---|---|---|---|---|---|
| FIRST BROADCASTING SCHEDULE INFORMATION | 1-1 | onid: 1, tsid: 30, sid: 40 | CHANNEL A | PM 7:00 PROGRAM 1 | PM 8:00 PROGRAM 2 | ... |
| | 1-2 | – | 채널 비 | PM 7:00 PROGRAM 3 | ... |
| | 1-3 | onid: 1, tsid: 30, sid: 41 | C CHANNEL | PM 7:00 PROGRAM 4 | PM 8:00 PROGRAM 5 | ... |

SECOND BROADCASTING CHANNEL

| | | CHANNEL IDENTIFIER | CHANNEL NAME | BROADCASTING PROGRAM INFORMATION | |
|---|---|---|---|---|---|
| SECOND BROADCASTING SCHEDULE INFORMATION | 2-1 | onid: 1, tsid: 30, sid: 40 | CHANNEL A | PM 7:00 PROGRAM 1 | PM 8:00 PROGRAM 2 | ... |
| | 2-2 | onid: 1, tsid: 31, sid: 40 | CHANNEL B | PM 7:00 PROGRAM 3 | ... |
| | 2-3 | onid: 1, tsid: 32, sid: 40 | CHANNEL C | PM 7:00 PROGRAM 4 | PM 8:00 PROGRAM 5 | ... |

FIG. 8

| FIRST BROADCASTING CHANNEL | | SECOND BROADCASTING CHANNEL | |
|---|---|---|---|
| 1-1 | CHANNEL A | 2-1 | CHANNEL A |

(a)

| FIRST BROADCASTING CHANNEL | | SECOND BROADCASTING CHANNEL | |
|---|---|---|---|
| 1-1 | CHANNEL A | 2-1 | CHANNEL A |
| 1-2 | 채널 비 | 2-2 | CHANNEL B |
| 1-3 | C CHANNEL | 2-3 | CHANNEL C |

(b)

ELECTRONIC APPARATUS AND CONTROL METHOD THEREOF

CROSS-REFERENCE TO RELATED APPLICATION(S)

This application is a bypass continuation of International Application No. PCT/KR2022/003657, filed on Mar. 16, 2022, which is based on and claims priority to Korean Patent Application No. 10-2021-0034156, filed on Mar. 16, 2021, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus capable of increasing a matching success rate between a broadcasting channel included in a broadcasting signal received from a broadcasting station and a broadcasting channel included in metadata provided from an external company, and a control method thereof.

2. Description of Related Art

In recent years, along with various needs of users for broadcasting contents, various services are provided based on metadata for broadcasting contents.

However, in order to identify the broadcasting channel included in the actual broadcasting signal based on the metadata, it is necessary to perform a process of matching the broadcasting channel included in metadata with the broadcasting channel included in the broadcasting signal.

In recent years, the matching was failed due to a low accuracy due to data omission, error, and the like of the metadata, and this caused a deterioration in service quality.

Therefore, it is required to provide a method for increasing the matching success rate between the broadcasting channel included in the metadata and the broadcasting channel included in the broadcasting signal.

SUMMARY

The disclosure is to solve the above problem and an object of the disclosure is to provide an electronic apparatus which provides, not only a method for matching channels by comparing existing channel identifiers, but also a matching method with an improved matching success rate by comparing channel names and broadcasting program information, and a control method thereof.

In accordance with an embodiment of the disclosure, there is provided an electronic apparatus including a communication interface configured to communicate with a server, a broadcasting signal receiver configured to receive a broadcasting signal, and a processor configured to receive first broadcasting schedule information including channel names and broadcasting program information for a plurality of first broadcasting channels received from the server through the communication interface, obtain second broadcasting schedule information including channel names and broadcasting program information for a plurality of second broadcasting channels from the broadcasting signal, and match the plurality of first broadcasting channels included in the first broadcasting schedule information with the plurality of second broadcasting channels included in the second broadcasting schedule information, generate a channel matching table by matching the plurality of first broadcasting channels with the plurality of second broadcasting channels by comparing at least one of the channel names included in the first broadcasting schedule information or the broadcasting program information included in the first broadcasting schedule information with at least one of the channel names included in the second broadcasting schedule information or the broadcasting program information included in the second broadcasting schedule information.

Each of the broadcasting program information for the plurality of first broadcasting channels and the plurality of second broadcasting channels includes a program title of broadcasting program and broadcasting time information, respectively, and the processor may be configured to match the plurality of first broadcasting channels with the plurality of second broadcasting channels based on the program title and the broadcasting time information of each of the plurality of first broadcasting channels and the plurality of second broadcasting channels.

The processor may be configured to, match a first broadcasting channel of the plurality of first broadcasting channels with a second broadcasting channel of the plurality of second broadcasting channels based on a calculated percentage, that the program title and the broadcasting time information of each of the first broadcasting channel and the second broadcasting channel correspond to each other being equal to or higher than a predetermined percentage.

The first broadcasting schedule information may include channel identifiers for the plurality of first broadcasting channels, and the second broadcasting schedule information may include channel identifiers for the plurality of second broadcasting channels, and the processor may be configured to match a first broadcasting channel of the plurality of broadcasting channels with a second broadcasting channel having identical channel identifiers by comparing the channel identifiers of each of the plurality of first broadcasting channels and the plurality of second broadcasting channels, and match at least one of the channel name or the broadcasting program information of a remaining first broadcasting channels with at least one of the channel names or the broadcasting program information of the remaining second broadcasting channels which are not the matched broadcasting channels among the plurality of first broadcasting channels and the plurality of second broadcasting channels.

The processor may be configured to, based on the second broadcasting schedule information being obtained from the broadcasting signal received through the broadcasting signal receiver, search for a broadcasting channel of the plurality of first broadcasting channels included in the first broadcasting schedule information matched with each of the plurality of second broadcasting channels included in the second broadcasting schedule information.

The electronic apparatus may further include a memory configured to store the channel matching table, the processor may be configured to, based on the matched broadcasting channel of the plurality of first broadcasting channels being with respect to the second broadcasting channels, update the channel matching table to include information indicating that the first broadcasting channel corresponding to the second broadcasting channel is matched.

The broadcasting signal receiver may include a tuner, and the processor may be configured to, based on a channel selection command for any one of the plurality of first broadcasting channels being input through the communication interface, identify a second broadcasting channel corresponding to a first broadcasting channel selected by the channel selection command based on the channel matching table, and control the tuner to tune a broadcasting signal corresponding to the identified second broadcasting channel.

In accordance with another embodiment of the disclosure, there is provided a method for controlling an electronic apparatus, the method including receiving first broadcasting schedule information including channel names and broadcasting program information for a plurality of first broadcasting channels from a server; receiving a broadcasting signal and obtaining second broadcasting schedule information including channel names and broadcasting program information for a plurality of second broadcasting channels from the received broadcasting signal, and matching the plurality of first broadcasting channels included in the first broadcasting schedule information with the plurality of second broadcasting channels included in the second broadcasting schedule information, in which the matching includes generating a channel matching table by matching the plurality of first broadcasting channels with the plurality of second broadcasting channels by comparing at least one of the channel name or the broadcasting program information included in the first broadcasting schedule information with at least one of the channel name or the broadcasting program information included in the second broadcasting schedule information.

The broadcasting program information may include a program title of broadcasting program and broadcasting time information, and the matching may include matching the plurality of first broadcasting channels with the plurality of second broadcasting channels based on the program title and the broadcasting time information of each of the plurality of first broadcasting channels and the plurality of second broadcasting channels.

The matching may include, based on a percentage that the program title and the broadcasting time information of each of the first broadcasting channel and the second broadcasting channel correspond to each other being equal to or higher than a predetermined percentage, matching the first broadcasting channel with the second broadcasting channel.

The first broadcasting schedule information may include channel identifiers for the plurality of first broadcasting channels, and the second broadcasting schedule information may include channel identifiers for the plurality of second broadcasting channels, and the matching may include matching a first broadcasting channel with a second broadcasting channel having the same channel identifiers by comparing the channel identifiers of each of the plurality of first broadcasting channels and the plurality of second broadcasting channels, and comparing and matching at least one of the channel name or the broadcasting program information of the remaining first broadcasting channels with at least one of the channel name or the broadcasting program information of the remaining second broadcasting channels which are other than the matched broadcasting channels among the plurality of first broadcasting channels and the plurality of second broadcasting channels.

The control method may further include, based on the second broadcasting schedule information being obtained from the broadcasting signal received through the broadcasting signal receiver, searching for a broadcasting channel of the plurality of first broadcasting channels included in the first broadcasting schedule information matched with each of the plurality of second broadcasting channels included in the second broadcasting schedule information.

The control method may further include storing the channel matching table, and based on the matched broadcasting channel of the plurality of first broadcasting channels being searched as a result of the search with respect to the second broadcasting channels, updating the channel matching table to include information indicating that the first broadcasting channel corresponding to the second broadcasting channel is matched.

The control method may further include, based on a channel selection command for any one of the plurality of first broadcasting channels being input, identifying a second broadcasting channel corresponding to a first broadcasting channel selected by the channel selection command based on the channel matching table, and tuning a broadcasting signal corresponding to the identified second broadcasting channel.

In accordance with another embodiment of the disclosure, there is provided a non-transitory computer-readable recording medium storing a program for controlling an electronic apparatus, the program including receiving first broadcasting schedule information including channel names and broadcasting program information for a plurality of first broadcasting channels from a server, receiving a broadcasting signal and obtaining second broadcasting schedule information including channel names and broadcasting program information for a plurality of second broadcasting channels from the received broadcasting signal, and matching the plurality of first broadcasting channels included in the first broadcasting schedule information with the plurality of second broadcasting channels included in the second broadcasting schedule information, in which the matching includes generating a channel matching table by matching the plurality of first broadcasting channels with the plurality of second broadcasting channels by comparing at least one of the channel name or the broadcasting program information included in the first broadcasting schedule information with at least one of the channel name or the broadcasting program information included in the second broadcasting schedule information.

BRIEF DESCRIPTION OF THE DRAWINGS

FIG. 5 is a diagram illustrating an operation of matching broadcasting channels based on channel identifiers by the electronic apparatus according to an embodiment;

FIG. 6 is a diagram illustrating an operation of matching broadcasting channels based on channel names by the electronic apparatus according to an embodiment;

FIG. 7 is a diagram illustrating an operation of matching broadcasting channels based on broadcasting program information by the electronic apparatus according to an embodiment;

FIG. 8 is a diagram illustrating each of a channel matching table (a) generated based on channel identifiers of the related art, and a channel matching table (b) generated through a channel matching operation according to an embodiment;

DETAILED DESCRIPTION

Figure 1:
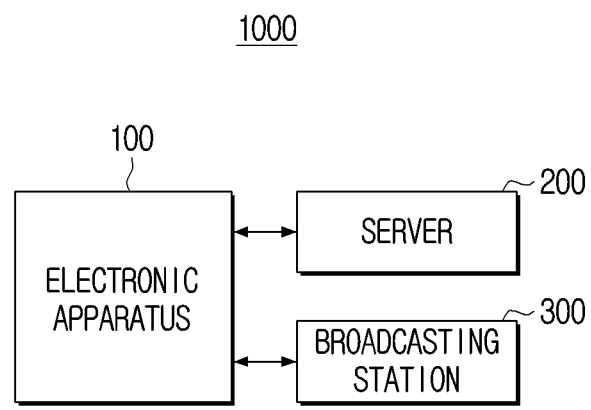
FIG. 1 is a diagram schematically illustrating an electronic system according to an embodiment.

The examples described below are exemplified for understanding of the disclosure and it should be understood that the disclosure may be modified and performed variously unlike in the examples described herein. However, in describing the disclosure, a detailed description of the related art or configuration may be omitted when it is determined that the detailed description may unnecessarily obscure a gist of the disclosure. In addition, the accompanying drawings may not be illustrated with actual scales but may be illustrated with enlarged dimensions of some elements, for the understanding of the disclosure.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

The expressions "first," "second" and the like may be used for describing various elements, but the elements may not be limited by the expressions. The expressions may be used only to distinguish one element from another. For example, a first element may be referred to as a second element and the second element may also be similarly referred to as the first element, while not departing from the scope of a right of the disclosure.

Further, in the specification, elements necessary for describing each embodiment of the disclosure are described, and accordingly, there is no limitation thereto. Therefore, some elements may be changed or omitted and other elements may be added. In addition, the elements may be divided and disposed in different independent devices.

The embodiments of the disclosure will be described in detail with reference to the accompanying drawings and description in the accompanying drawings, but the disclosure is not limited by the embodiments.

Hereinafter, the disclosure will be described in detail with reference to FIGS. 1 to 10.

FIG. 1 is a diagram schematically illustrating an electronic system according to an embodiment.

Referring to FIG. 1, an electronic system may include an electronic apparatus 100, a server 200, and a broadcasting station 300.

The electronic apparatus 100 is an apparatus that receives a content signal and autonomously provides an image and/or a sound based on the content signal or provides an image and/or a sound through another electronic apparatus connected to the electronic apparatus 100, and may be, for example, a television, a set-top box, and the like.

The electronic apparatus 100 may receive various pieces of information from the server 200, receive a broadcasting signal broadcasted from the broadcasting station 300, and provide a broadcasting content included in the broadcasting signal to a user.

As an example of the disclosure, the electronic apparatus 100 may be a display apparatus including a display for providing a visual content and a user interface to the user, and may be implemented as various types of apparatuses such as a TV, a smart TV, an Internet TV, a web TV, Internet Protocol Television (IPTV), a digital signage, a PC, a tablet, and the like.

The server 200 may refer to an electronic apparatus that collects and processes data of an external apparatus. For example, the server 200 may be implemented as, not only an apparatus which performs a server-dedicated function such as a cloud server or the like, but also various electronic apparatuses such as a smartphone, a tablet, a wearable device, a PC, or the like capable of performing a function of the server together with other functions. However, this is merely an embodiment and the server 200 may also be implemented as various types of electronic apparatuses not listed above. In addition, the server 200 may be implemented as one apparatus or implemented as an assembly configured with a plurality of apparatuses.

In an embodiment of the disclosure, the server 200 may be a server managed by a provider that provides metadata. The electronic apparatus 100 may be connected to the server 200 by various communication methods through a communication interface 110 to receive metadata such as broadcasting schedule information (electronic program guide (EPG)).

Figure 2:
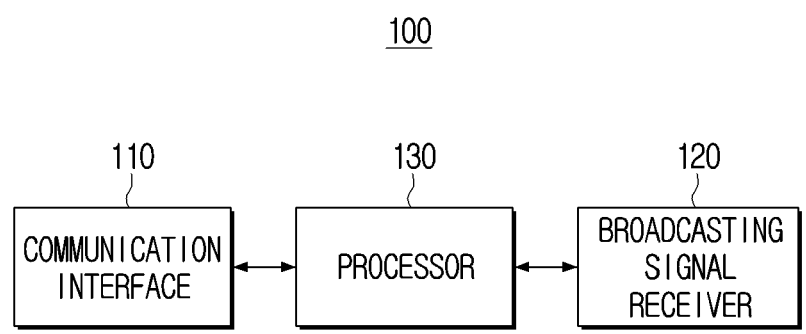
FIG. 2 is a block diagram illustrating a configuration of an electronic apparatus according to an embodiment.

FIG. 2 is a block diagram illustrating a configuration of the electronic apparatus according to an embodiment.

Referring to FIG. 2, the electronic apparatus 100 may include the communication interface 110, a broadcasting signal receiver 120, and a processor 130.

The electronic apparatus 100 may receive first broadcasting schedule information including a channel identifier, a channel name, and broadcasting program information for a plurality of first broadcasting channels from the server 200 through the communication interface 110.

The communication interface 110 may communicate with an external apparatus through a local area network (LAN), the Internet network, and a mobile communication network, and may communicate with the external apparatus through various communication methods such as Bluetooth (BT), Bluetooth Low Energy (BLE), Wireless Fidelity (WI-FI), Wireless Fidelity Direct (WI-FI Direct), Zigbee, NFC, and the like. Through this, the communication interface 110 may include various communication modules for performing network communication. For example, the communication interface 110 may include a Bluetooth chip, a Wi-Fi chip, a wireless communication chip, and the like.

The electronic apparatus 100 may receive a broadcasting signal broadcasted from the broadcasting station 300 through the broadcasting signal receiver 120. The electronic apparatus 100 may obtain second broadcasting schedule information including a channel identifier, a channel name, and broadcasting program information for a plurality of second broadcasting channels from the broadcasting signal received through the broadcasting signal receiver 120.

The processor 130 may be electrically connected to the communication interface 110 and the broadcasting signal receiver 120 and control general operations of the electronic apparatus 100.

According to an embodiment of the disclosure, the processor 130 may be implemented as a digital signal processor (DSP), a microprocessor, and a time controller (TCON) for processing digital signals. However, there is no limitation thereto, and the processor may include one or more of a central processing unit (CPU), a microcontroller unit (MCU), a microprocessing unit (MPU), a controller, an application processor (AP), or a communication processor (CP), an ARM processor, and an artificial intelligence (AI) processor or may be defined as the corresponding term. In addition, the processor 130 may be implemented as System on Chip (SoC) or large scale integration (LSI) including the processing algorithm or may be implemented in form of a field programmable gate array (FPGA). The processor 130 may perform various functions by executing computer executable instructions stored in a memory 140.

The processor 130 may generate a channel matching table by matching the plurality of first broadcasting channels included in the first broadcasting schedule information with the plurality of second broadcasting channels included in the second broadcasting schedule information by comparing at least one of the channel identifier, the channel name, or the broadcasting program information included in the first broadcasting schedule information received through the communication interface 110 with at least one of the channel identifier, the channel name, or the broadcasting program information included in the second broadcasting schedule information obtained from the broadcasting signal received through the broadcasting signal receiver 120.

In other words, the processor 130 may match the corresponding broadcasting channels among the plurality of broadcasting channels included in each of the first broadcasting schedule information received through the server 200 and the second broadcasting schedule information included in the broadcasting signal received from the broadcasting station 300 based on the channel identifier, the channel name, and the broadcasting program.

Accordingly, compared to the matching of the broadcasting channels only with the channel identifier in the related art, it is possible to enhance a matching success rate between the broadcasting channel (first broadcasting channel) included in the first broadcasting schedule information obtained through the server 200 and the broadcasting channel (second broadcasting channel) included in the broadcasting signal received from the broadcasting station 300, and generate a channel matching table with increased amount and quality of the channel matching information. The channel matching operation of the processor 130 will be described below in detail.

Figure 3:
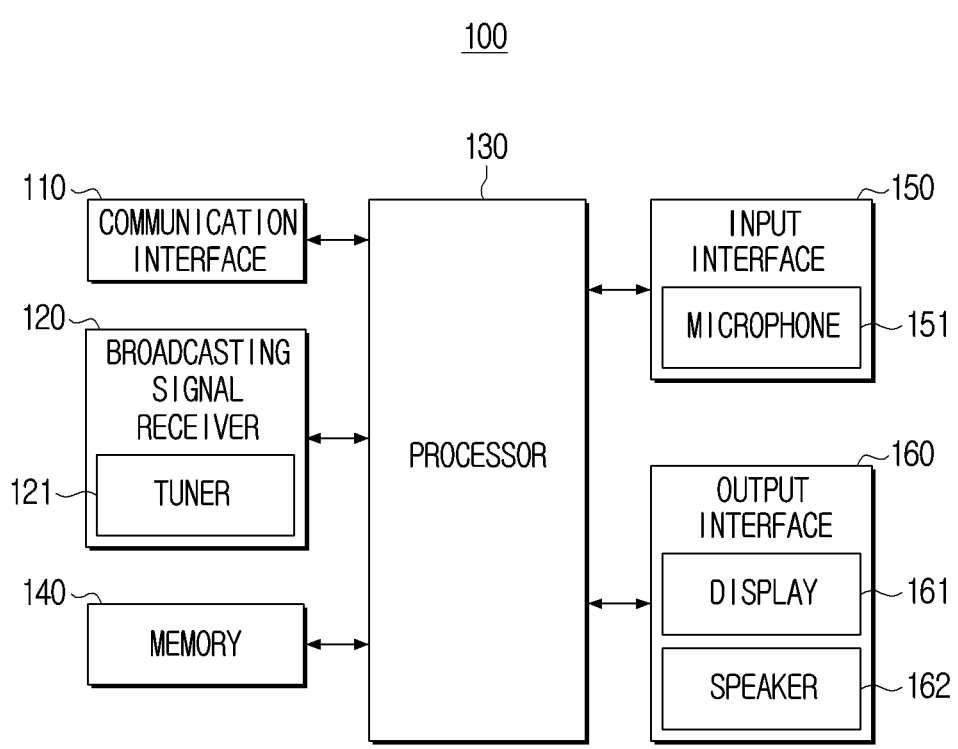
FIG. 3 is a block diagram illustrating a specific configuration of the electronic apparatus according to an embodiment.

FIG. 3 is a block diagram illustrating a specific configuration of the electronic apparatus according to an embodiment.

Referring to FIG. 3, the electronic apparatus 100 may include the communication interface 110, the broadcasting signal receiver 120, the processor 130, the memory 140, an input interface 150, and an output interface 160. The detailed description of the configuration illustrated in FIG. 3 that is overlapped with the configuration illustrated in FIG. 2 will not be repeated.

The broadcasting signal receiver 120 may include a tuner 121. The tuner 121 may tune and select only a frequency of a channel to be received by the electronic apparatus 100 among a plurality of radio wave components through amplification, mixing, and resonance of a broadcast signal received in a wired or wireless manner.

The tuner 121 may receive a broadcasting signal including video, audio, and additional data in a frequency band corresponding to the channel selected by the user, and receive the broadcasting signal from various sources such as ground-wave broadcasting, cable broadcasting, satellite broadcasting, and the like. The tuner 121 may receive the broadcasting signal from a source such as analogue broadcasting or digital broadcasting.

The broadcasting signal received through the tuner 121 may include video data, audio data, and metadata that is information related to a program. The metadata may include additional information on a broadcasting program included in a broadcasting schedule or a broadcasting channel, for example, a program title of broadcasting program, broadcasting time information (e.g., broadcasting start time and broadcasting end time), information on a content, and the like. The metadata that is information related to the broadcasting program may be received through, not only the tuner 121, but also the communication interface 110 from the Internet server.

The memory 140 may store an operating system (OS) for controlling general operations of constituent elements of the electronic apparatus 100 and instructions or data related to the constituent elements of the electronic apparatus 100.

The memory 140 may store a channel matching table generated by the processor 130. In this case, the processor 130 may update a channel matching table stored in the memory 140. In an example, when the second broadcasting schedule information is obtained from the broadcasting signal received through the broadcasting signal receiver 120, the processor 130 may search for a matched broadcasting channel among the plurality of first broadcasting channels included in the first broadcasting schedule information with respect to each of the plurality of second broadcasting channels included in the second broadcasting schedule information, and when the matched broadcasting channel of the plurality of first broadcasting channels is searched with respect to the second broadcasting channels, the processor 130 may update the channel matching table stored in the memory 140 to include the information indicating the matching of the first broadcasting channel corresponding to the second broadcasting channel.

The input interface 150 may receive an input of various user commands. For example, the input interface 150 may receive an input of a user command for controlling the electronic apparatus 100 or receive an input of a user command to be transmitted to an external apparatus. For example, the input interface 150 may include a microphone 151 for receiving a user utterance voice.

The output interface 160 may include at least one of a display 161 or a speaker 162. Here, the display 161 is an apparatus that outputs information in a visual form (e.g., text, image, and the like). The display may display an image frame in an entire or partial area of a display area. The display area may refer to the entire area in a pixel unit where information or data is visually displayed. The speaker 162 is an apparatus that outputs information in an auditory form (e.g., voice). The speaker may output not only various pieces of audio data obtained by executing various processing such as decoding, amplification, or noise filtering by an audio processor (not shown), but also various alerts or voice messages.

The display 161 may display a content in a visual form. The display 161 may be implemented as various types of displays such as a liquid crystal display panel (LCD), a light emitting diode (LED), an organic light emitting diode (OLED), a liquid crystal on silicon (LCoS), digital light processing (DLP), and the like.

Figure 4:
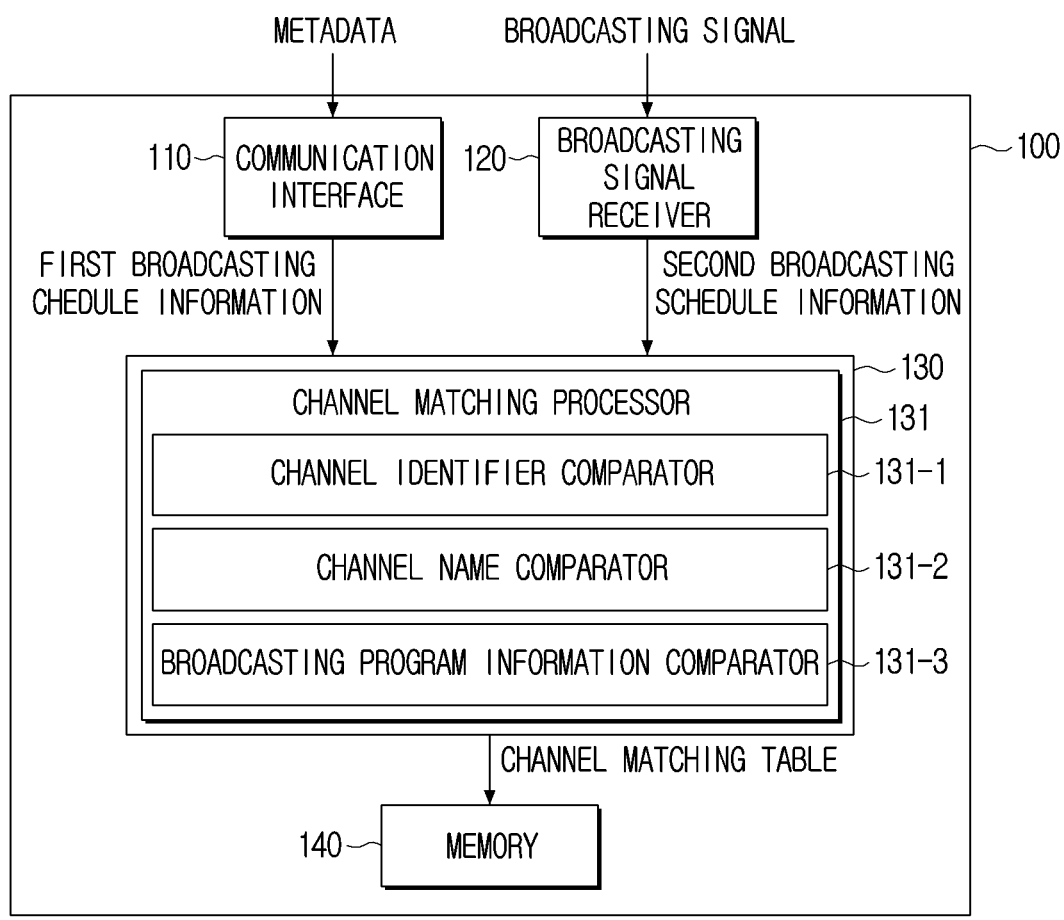
FIG. 4 is a diagram illustrating an operation of generating a channel matching table by the electronic apparatus according to an embodiment.

FIG. 4 is a diagram illustrating an operation of generating a channel matching table by the electronic apparatus according to an embodiment.

Referring to FIG. 4, the electronic apparatus 100 may obtain first broadcasting schedule information from metadata received through the communication interface 110 and obtain second broadcasting schedule information from the broadcasting signal received through the broadcasting signal receiver 120.

The electronic apparatus 100 may generate the channel matching table by matching the plurality of first broadcasting channels included in the first broadcasting schedule information with the plurality of second broadcasting channels included in the second broadcasting schedule information through a channel matching processor 131 of the processor 130, and store the generated channel matching table in the memory 140.

Specifically, the electronic apparatus 100 may match the plurality of first broadcasting channels with the plurality of second broadcasting channels by comparing the channel identifiers, the channel names, and the broadcasting program information through a channel identifier comparator 131-1, a channel name comparator 131-2, and a broadcasting program information comparator 131-3.

Accordingly, by improving the matching success rate between the first broadcasting channel included in the first broadcasting schedule information received through the server 200 and the second broadcasting channel included in the broadcasting signal, it is possible to enhance quality of various services (e.g., voice assistant, content recommendation service, and automatic contents recognition (ACR) service) provided to the user based on the metadata provided from the server 200.

As an example of the service provided to the user based on the metadata, the electronic apparatus 100 may tune the broadcasting channel corresponding to a user's voice by recognizing the user's voice. When a channel selection command, for example, a user's voice uttering a channel name is input through the microphone, the electronic apparatus 100 may obtain the channel name uttered by the user through voice recognition of an input voice signal. The electronic apparatus 100 may search for a channel name uttered by the user in the first broadcasting schedule information provided from the server 200 and identify the first broadcasting channel corresponding to the channel name. The electronic apparatus 100 may identify the second broadcasting channel corresponding to the identified first broadcasting channel based on the channel matching table in which the first broadcasting channel is matched with the second broadcasting channel. Accordingly, the electronic apparatus 100 may provide a content of the broadcasting channel corresponding to the channel selection command to the user by controlling the tuner 121 to receive the broadcasting signal corresponding to the identified second broadcasting channel.

In another example of the service provided to the user, the electronic apparatus 100 may provide a recommended content based on view history information of the user. The electronic apparatus 100 may generate a recommended channel list among the plurality of first broadcasting channels included in the first broadcasting schedule information provided from the server 200 based on the view history information of the user. In the same manner, the electronic apparatus 100 may identify the second broadcasting channel corresponding to the first broadcasting channel included in the recommended channel list based on the channel matching table. Accordingly, the electronic apparatus 100 may provide the identified second broadcasting channel as the recommended channel to the user.

FIG. 5 is a diagram illustrating an operation of matching broadcasting channels based on channel identifiers by the electronic apparatus according to an embodiment.

FIG. 5 illustrates channel identifiers, channel names, broadcasting program information of the plurality of first broadcasting channels included in the first broadcasting schedule information obtained from the server 200 and illustrates channel identifiers, channel names, and broadcasting program information of the plurality of second broadcasting channels included in the second broadcasting schedule information obtained from the broadcasting signal received from the broadcasting station 300.

The electronic apparatus 100 may match the first broadcasting channel and the second broadcasting channel which have the same channel identifier by comparing the channel identifiers of each of the plurality of first broadcasting channels and the plurality of second broadcasting channels.

Referring to FIG. 5, a channel 1-1 of the plurality of first broadcasting channels and a channel 2-1 of the plurality of second broadcasting channels have the same channel identifier, and accordingly, the electronic apparatus 100 may match the channel 1-1 with the channel 2-1. In other words, the electronic apparatus 100 may identify that the channel 1-1 included in the first broadcasting schedule information and the channel 2-1 included in the second broadcasting schedule information are the same broadcasting channels.

However, when receiving the first broadcasting schedule information from the server 200 of an external metadata provider, the channel identifier was omitted or incorrect channel identifier was included in some cases, and accordingly, the broadcasting channel matching was not smoothly performed.

Therefore, the electronic apparatus 100 according to an embodiment of the disclosure matches the broadcasting channels by using, not only the channel identifier included in the broadcasting schedule information, but also the channel name and the broadcasting program information, thereby increasing the channel matching success rate.

The electronic apparatus 100 may compare and match at least one of the channel name or the broadcasting program of remaining broadcasting channels other than the broadcasting channels matched by using the channel identifier. However, the order of applying the channel matching method is not limited thereto, and the electronic apparatus 100 may match the broadcasting channels by using at least one of the channel name or the broadcasting program information without using the channel identifier.

FIG. 6 is a diagram illustrating an operation of matching broadcasting channels based on channel names by the electronic apparatus according to an embodiment.

Referring to FIG. 6, the omission of the channel identifier may be confirmed in a case of the channel 1-2 included in the first broadcasting schedule information. In this case, if the method for performing the channel matching by using only the channel identifier in the related art is used, the channel matching of the channel 1-2 may not be realized.

However, according to an embodiment of the disclosure, the electronic apparatus 100 may match the broadcasting channels by using the channel name information included in the first broadcasting schedule information and the second broadcasting schedule information.

Specifically, the electronic apparatus 100 may calculate a similarity between the channel name of the first broadcasting channel and the channel name of the second broadcasting channel by using an algorithm for predicting a similarity of character strings, and may match the two broadcasting channels with each other, if the calculated similarity is a predetermined value or more.

For example, referring to FIG. 6, "채널 비" that is a channel name of a channel 1-2 of the first broadcasting channels is Korean of "Channel B" that is a channel name of a channel 2-2 of the second broadcasting channels, and accordingly, a high similarity between the two broadcasting channels may be calculated. The electronic apparatus 100 may match the channel 1-2 with the channel 2-2 based on the calculated similarity.

FIG. 7 is a diagram illustrating an operation of matching broadcasting channels based on broadcasting program information by the electronic apparatus according to an embodiment.

Referring to FIG. 7, a channel 1-3 of the first broadcasting channels and a channel 2-3 of the second broadcasting channels have different channel identifiers and channel names, respectively.

The electronic apparatus 100 may perform the channel matching by using the broadcasting program information for each broadcasting channel.

The broadcasting program information may include a program title of broadcasting program and broadcasting time information scheduled for each broadcasting channel. The electronic apparatus 100 may match the broadcasting channels based on the program title and the broadcasting time information of each of the plurality of first broadcasting channels and the plurality of second broadcasting channels.

Referring to FIG. 7, the channel 1-3 of the first broadcasting channels of the first broadcasting schedule information may include program titles scheduled in the corresponding broadcasting channel and broadcasting time information of each program, such as "PM 7:00 Program 4" and "PM 8:00 Program 5". Meanwhile, the channel 2-3 of the second broadcasting channels of the second broadcasting schedule information may also include broadcasting program information such as "PM 7:00 Program 4" and "PM 8:00 Program 5". In this case, the electronic apparatus 100 may match the channel 1-3 with the channel 2-3 which are determined to have the corresponding broadcasting program information.

Meanwhile, although the broadcasting program information does not completely correspond, if a percentage that the program title and the program broadcasting time information of each of the first broadcasting channels and the second broadcasting channels correspond to each other is equal to or higher than a predetermined percentage, the electronic apparatus 100 may determine and match the channels as the same channel.

The electronic apparatus 100 may generate a channel matching table in which the plurality of first broadcasting channels included in the first broadcasting schedule information is matched with the plurality of second broadcasting channels included in the second broadcasting schedule information based on the matching result obtained using the channel identifiers, the channel names, and the broadcasting program information. The electronic apparatus 100 may store the generated channel matching table in the memory 140.

In addition, when the second broadcasting schedule information is obtained from the broadcasting signal received through the broadcasting signal receiver 120, the electronic apparatus 100 may search for a matched broadcasting channel among the plurality of first broadcasting channels included in the first broadcasting schedule information in each of the second broadcasting channels included in the second broadcasting schedule information. As a result of the search for the second broadcasting channels, when the matched broadcasting channel of the plurality of first broadcasting channels is searched, the electronic apparatus 100 may update the channel matching table to include the information indicating that the first broadcasting channel corresponding to the second broadcasting channel is matched.

FIG. 8 is a diagram illustrating each of a channel matching table a generated based on channel identifiers of the related art, and a channel matching table b generated through a channel matching operation according to an embodiment.

Referring to FIGS. 5 to 8, in a case of performing the channel matching based on the channel identifier in the related art, the channel matching information included in a channel matching table 8a may include only the matching information of the channel 1-1 and the channel 2-1, since the channels with the same channel identifiers are only the channel 1-1 and the channel 2-1 when matching three channels included in the first broadcasting schedule information with three channels included in the second broadcasting schedule information.

In contrast, in a case of performing the channel matching by using the channel identifier, the channel name, and the broadcasting program information according to an embodiment of the disclosure, the channel matching success rate is increased, and accordingly, a channel matching table 8b with increased amount and quality of the channel matching information may be generated, compared to the channel matching table 8a according to the matching method of the related art.

Accordingly, it is possible to enhance the quality of the service provided to the user by using the channel matching table with the increased number of matched channels.

Figure 9:
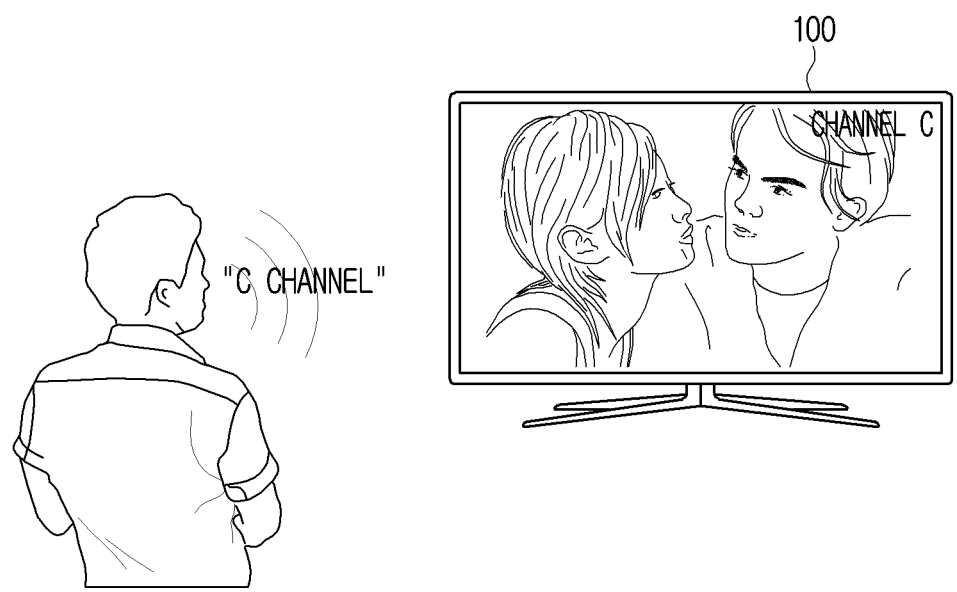
FIG. 9 is a diagram illustrating an example of a voice recognition service which is able to be provided by using the channel matching table generated by the electronic apparatus according to an embodiment.

FIG. 9 is a diagram illustrating an example of a voice recognition service which is able to be provided by using the channel matching table generated by the electronic apparatus according to an embodiment.

As an example of the service provided to the user, the electronic apparatus 100 may recognize a user's voice and tune the broadcasting channel corresponding to the user's voice. When a channel selection command, for example, a user's voice uttering a channel name is input through the microphone, the electronic apparatus 100 may obtain the channel name uttered by the user through voice recognition of an input voice signal.

Referring to FIG. 9, when the user utters "C channel" which is the channel name as the channel selection command, the electronic apparatus 100 may receive the user's voice, convert the user's voice into a voice signal, and obtain the channel name ("C channel") uttered by the user through the voice recognition for the voice signal.

The electronic apparatus 100 may search for a broadcasting channel having the channel name of "C channel" from the first broadcasting schedule information, and confirm that a broadcasting channel corresponding to the input channel selection command is the channel 1-3 of the plurality of first broadcasting channels.

The electronic apparatus 100 may identify the second broadcasting channel corresponding to the first broadcasting channel that is confirmed as corresponding to the channel selection command by using the channel matching table. Referring to the channel matching table b of FIG. 8, the second broadcasting channel matched to the channel 1-3 of the first broadcasting channels may be identified as the channel 2-3. The electronic apparatus 100 may control the tuner 121 to receive the broadcasting signal corresponding to the identified channel 2-3, and provide a content of the broadcasting channel corresponding to the channel selection command to the user.

Figure 10:
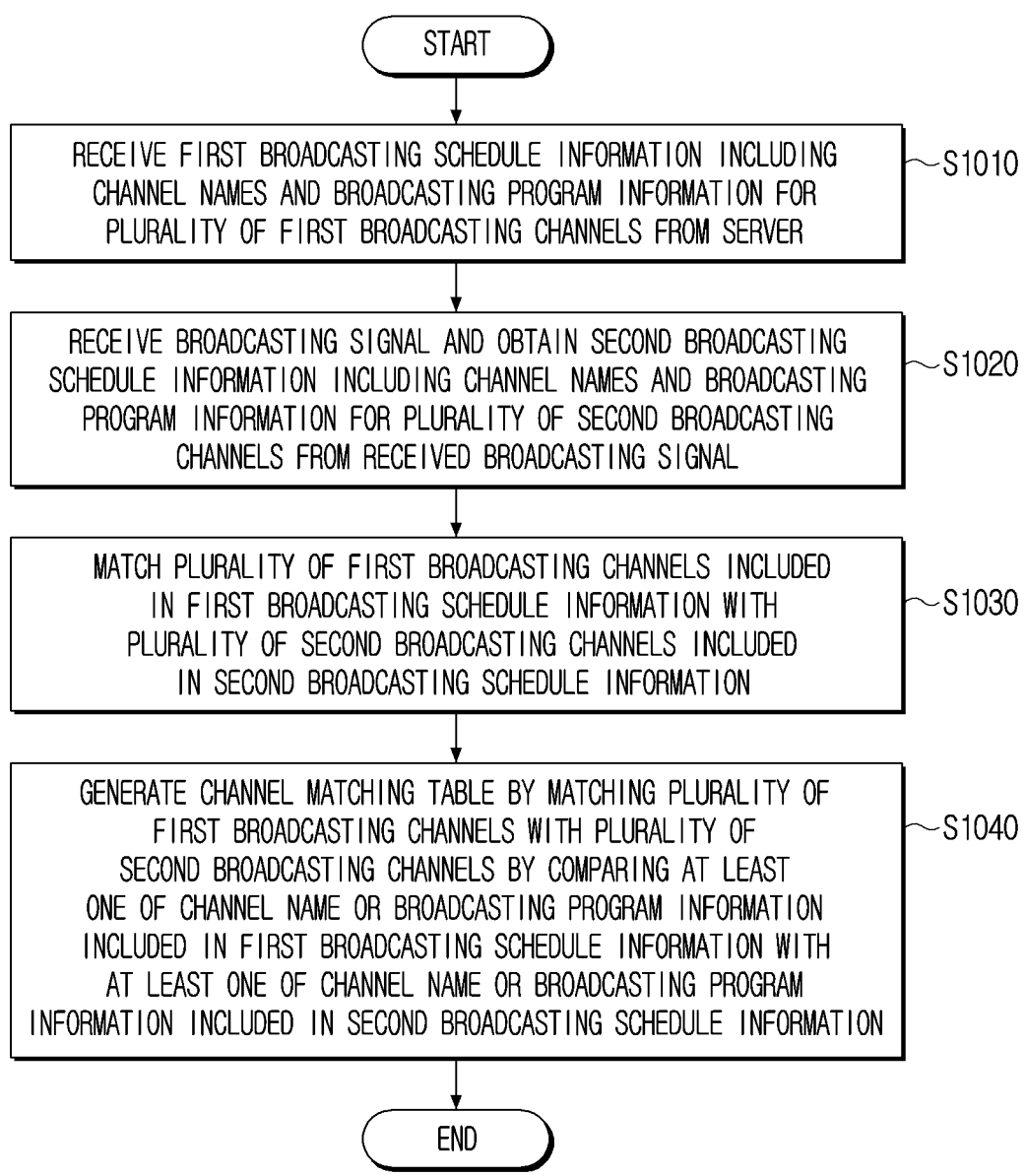
FIG. 10 is a flowchart illustrating a method for controlling the electronic apparatus according to an embodiment.

FIG. 10 is a flowchart illustrating a method for controlling the electronic apparatus according to an embodiment.

Referring to FIG. 10, a method for controlling the electronic apparatus according to an embodiment of the disclosure may include receiving first broadcasting schedule information including channel names and broadcasting program information for a plurality of first broadcasting channels from a server (S1010), receiving a broadcasting signal and obtaining second broadcasting schedule information including channel names and broadcasting program information for a plurality of second broadcasting channels from the received broadcasting signal (S1020), matching the plurality of first broadcasting channels included in the first broadcasting schedule information with the plurality of second broadcasting channels included in the second broadcasting schedule information (S1030), and generating a channel matching table by matching the plurality of first broadcasting channels with the plurality of second broadcasting channels by comparing at least one of the channel name or the broadcasting program information of the first broadcasting schedule information with at least one of the channel name or the broadcasting program information of the second broadcasting schedule information (S1040).

First, the electronic apparatus may receive the first broadcasting schedule information including the channel names and the broadcasting program information for the plurality of first broadcasting channel from the server (S1010), and receive the broadcasting signal and obtain the second broadcasting schedule information including the channel names and the broadcasting program information for the plurality of second broadcasting channels from the received broadcasting signal (S1020). Herein, the server may be a metadata server which provides broadcasting channels and metadata related to the broadcasting program information included in each broadcasting channel. In addition, the second broadcasting schedule information obtained from the broadcasting signal may be electronic program guide (EPG) information of the broadcasting signal.

The electronic apparatus may match the plurality of first broadcasting channels included in the first broadcasting schedule information with the plurality of second broadcasting channels included in the second broadcasting schedule information (S1030).

In the matching (S1030), the electronic apparatus may generate the channel matching table by matching the plurality of first broadcasting channels with the plurality of second broadcasting channels by comparing at least one of the channel name or the broadcasting program information included in the first broadcasting schedule information with at least one of the channel name or the broadcasting program information included in the second broadcasting schedule information (S1040).

Herein, the broadcasting program information may include program title of broadcasting program and the broadcasting time information scheduled in each broadcasting channel. The electronic apparatus may match the plurality of first broadcasting channels with the plurality of second broadcasting channels based on the program titles and the broadcasting time information of each of the plurality of first broadcasting channels and the plurality of second broadcasting channels.

In this case, if a percentage that the program title and the broadcasting time information of each of the first broadcasting channels and the second broadcasting channels correspond to each other is equal to or higher than a predetermined percentage, the electronic apparatus may match the first broadcasting channels with the second broadcasting channels.

Accordingly, by enhancing the matching success rate between the plurality of first broadcasting channels included in the first broadcasting schedule information received through the server and the plurality of second broadcasting channels included in the second broadcasting schedule information obtained from the broadcasting signal, it is possible to enhance the quality of various services provided to the user based on the metadata provided from the server.

Meanwhile, computer instructions for executing processing operations on the electronic apparatus according to the embodiments of the disclosure descried above may be stored in a non-transitory computer-readable medium. When the computer instructions stored in such a non-transitory computer-readable medium are executed by the processor of a specific machine, the computer instructions may enable the specific machine to execute the processing operations of the electronic apparatus according to the various embodiments described above.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

The methods according to various embodiments may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
   a communication interface configured to communicate with a server;
   a broadcasting signal receiver configured to receive a broadcasting signal; and
   a processor configured to:

receive first broadcasting schedule information including channel names and broadcasting program information for a plurality of first broadcasting channels received from the server through the communication interface, the broadcasting program information for the plurality of first broadcasting channels including first program title of broadcasting program and corresponding broadcasting time information, obtain second broadcasting schedule information including channel names and broadcasting program information for a plurality of second broadcasting channels from the broadcasting signal, the broadcasting program information for the plurality of second broadcasting channels including second program title of broadcasting program and corresponding broadcasting time information, perform a first comparing of at least one channel name among the channel names included in the first broadcasting schedule information with at least one channel name among the channel names included in the second broadcasting schedule information, perform a second comparing of the broadcasting program information included in the first broadcasting schedule information with the broadcasting program information included in the second broadcasting schedule information, and generate a channel matching table of the plurality of first broadcasting channels included in the first broadcasting schedule information received from the server and the plurality of second broadcasting channels included in the second broadcasting schedule information obtained from the broadcasting signal upon a match resulting from the first comparing of the at least one channel name and the second comparing of the broadcasting program information, wherein the second comparing is based on whether a correspondence of the first program title and corresponding broadcasting time information of the broadcasting program information for the plurality of first broadcasting channels and the second program title and corresponding broadcasting time information of the broadcasting program information for the plurality of second broadcasting channels to each other is within a calculated percentage, wherein the processor is configured to:
match a first broadcasting channel of the plurality of first broadcasting channels with a second broadcasting channel of the plurality of second broadcasting channels based on the calculated percentage, that the first program title of broadcasting program and corresponding broadcasting time information of each of the first broadcasting channel and the second program title of broadcasting program and corresponding broadcasting time information of each of the second broadcasting channel correspond to each other, being equal to or higher than a predetermined percentage.

2. The electronic apparatus according to claim 1, wherein the processor is configured to match the plurality of first broadcasting channels with the plurality of second broadcasting channels based on the first program title of broadcasting program and corresponding broadcasting time information for the plurality of first broadcasting channels and the second program title of broadcasting program and corresponding broadcasting time information for the plurality of second broadcasting channels.

3. The electronic apparatus according to claim 1, wherein the first broadcasting schedule information includes channel identifiers for the plurality of first broadcasting channels, and
the second broadcasting schedule information includes channel identifiers for the plurality of second broadcasting channels,
the processor is configured to
match a first broadcasting channel of the plurality of first broadcasting channels with a second broadcasting channel of the plurality of second broadcasting channels having identical channel identifiers by comparing the channel identifiers of each of the plurality of first broadcasting channels and the plurality of second broadcasting channels, and
match at least one of the channel names or the broadcasting program information of a remaining first broadcasting channels with at least one of the channel names or the broadcasting program information of a remaining second broadcasting channels which are not matched broadcasting channels among the plurality of first broadcasting channels and the plurality of second broadcasting channels.

4. The electronic apparatus according to claim 1, wherein the processor is configured to
based on the second broadcasting schedule information being obtained from the broadcasting signal received through the broadcasting signal receiver,
search for a broadcasting channel of the plurality of first broadcasting channels included in the first broadcasting schedule information matched with each of the plurality of second broadcasting channels included in the second broadcasting schedule information.

5. The electronic apparatus according to claim 4, further comprising:
a memory configured to store the channel matching table,
wherein the processor is configured to, based on a first broadcasting channel of the plurality of first broadcasting channels being searched with respect to the plurality of second broadcasting channels, update the channel matching table to include information indicating that the first broadcasting channel corresponding to a second broadcasting channel is matched.

6. The electronic apparatus according to claim 1, wherein the broadcasting signal receiver includes a tuner, and
the processor is configured to, based on a channel selection command for any one of the plurality of first broadcasting channels being input through the communication interface, identify a second broadcasting channel corresponding to a first broadcasting channel selected by the channel selection command based on the channel matching table, and control the tuner to tune a broadcasting signal corresponding to the identified second broadcasting channel.

7. A method of controlling an electronic apparatus, the method comprising:
receiving first broadcasting schedule information including channel names and broadcasting program information for a plurality of first broadcasting channels received from a server, the broadcasting program information for the plurality of first broadcasting channels including first program title of broadcasting program and corresponding broadcasting time information;
receiving a broadcasting signal and obtaining second broadcasting schedule information including channel names and broadcasting program information for a plurality of second broadcasting channels from the received broadcasting signal, the broadcasting program information for the plurality of second broadcasting channels including second program title of broadcasting program and corresponding broadcasting time information;

performing a first comparing of at least one channel name among the channel names included in the first broadcasting schedule information with at least one channel name among the channel names included in the second broadcasting schedule information;

performing a second comparing of the broadcasting program information included in the first broadcasting schedule information with the broadcasting program information included in the second broadcasting schedule information, and generating a channel matching table of the plurality of first broadcasting channels included in the first broadcasting schedule information received from the server and the plurality of second broadcasting channels included in the second broadcasting schedule information obtained from the broadcasting signal upon a match resulting from the first comparing of the at least one channel name and the second comparing of the broadcasting program information, wherein the second comparing is based on whether a correspondence of the first program title and corresponding broadcasting time information of the broadcasting program information for the plurality of first broadcasting channels and the second program title and corresponding broadcasting time information of the broadcasting program information for the plurality of second broadcasting channels to each other is within a calculated percentage wherein the second comparing comprises:
matching a first broadcasting channel of the plurality of first broadcasting channels with a second broadcasting channel of the plurality of second broadcasting channels based on the calculated percentage, that the first program title of broadcasting program and corresponding broadcasting time information of each of the first broadcasting channel and the second program title of broadcasting program and corresponding broadcasting time information of each of the second broadcasting channel correspond to each other, being equal to or higher than a predetermined percentage.

8. The method of controlling according to claim 7, wherein the second comparing comprises matching the plurality of first broadcasting channels with the plurality of second broadcasting channels based on the first program title of broadcasting program and corresponding broadcasting time information of each of the plurality of first broadcasting channels and the second program title of broadcasting program and corresponding broadcasting time information of each of the plurality of second broadcasting channels.

9. The method of controlling according to claim 7, wherein
the first broadcasting schedule information includes channel identifiers for the plurality of first broadcasting channels, and
the second broadcasting schedule information includes channel identifiers for the plurality of second broadcasting channels,
matching a first broadcasting channel of the plurality of first broadcasting channels with a second broadcasting channel of the plurality of second broadcasting channels having identical channel identifiers by comparing the channel identifiers of each of the plurality of first broadcasting channels and the plurality of second broadcasting channels, and matching at least one of the channel names or the broadcasting program information of a remaining first broadcasting channels with at least one of the channel names or the broadcasting program information of a remaining second broadcasting channels which are not matched broadcasting channels among the plurality of first broadcasting channels and the plurality of second broadcasting channels.

10. The method of controlling according to claim 7, further comprising:
based on the second broadcasting schedule information being obtained from the broadcasting signal received through a broadcasting signal receiver,
searching for a broadcasting channel of the plurality of first broadcasting channels included in the first broadcasting schedule information matched with each of the plurality of second broadcasting channels included in the second broadcasting schedule information.

11. The method of controlling according to claim 10, further comprising:
storing the channel matching table; and
based on a matched broadcasting channel of the plurality of first broadcasting channels being searched with respect to the plurality of second broadcasting channels, updating the channel matching table to include information indicating that the first broadcasting channel corresponding to the second broadcasting channel is matched.

12. The method of controlling according to claim 7, further comprising:
based on a channel selection command for any one of the plurality of first broadcasting channels being input, identifying a second broadcasting channel corresponding to a first broadcasting channel selected by the channel selection command based on the channel matching table; and
tuning a broadcasting signal corresponding to the identified second broadcasting channel.

13. A non-transitory computer-readable recording medium storing a program to implement a method of controlling an electronic apparatus, comprising:
receiving first broadcasting schedule information including channel names and broadcasting program information for a plurality of first broadcasting channels received from a server, the broadcasting program information for the plurality of first broadcasting channels including first program title of broadcasting program and corresponding broadcasting time information;
receiving a broadcasting signal and obtaining second broadcasting schedule information including channel names and broadcasting program information for a plurality of second broadcasting channels from the received broadcasting signal, the broadcasting program information for the plurality of second broadcasting channels including second program title of broadcasting program and corresponding broadcasting time information;
performing a first comparing of at least one channel name among the channel names included in the first broadcasting schedule information with at least one channel name among the channel names included in the second broadcasting schedule information;

performing a second comparing of the broadcasting program information included in the first broadcasting schedule information with the broadcasting program information included in the second broadcasting schedule information, and generating a channel matching table of the plurality of first broadcasting channels included in the first broadcasting schedule information received from the server and the plurality of second broadcasting channels included in the second broadcasting schedule information obtained from the broadcasting signal upon a match resulting from the first comparing of the at least one channel name and the second comparing of the broadcasting program information, wherein the second comparing is based on whether a correspondence of the first program title and corresponding broadcasting time information of the broadcasting program information for the plurality of first broadcasting channels and the second program title and corresponding broadcasting time information of the broadcasting program information for the plurality of second broadcasting channels to each other is within a calculated percentage, wherein the method of controlling comprises:
matching a first broadcasting channel of the plurality of first broadcasting channels with a second broadcasting channel of the plurality of second broadcasting channels based on the calculated percentage, that the first program title of broadcasting program and corresponding broadcasting time information of each of the first broadcasting channel and the second program title of broadcasting program and corresponding broadcasting time information of each of the second broadcasting channel correspond to each other, being equal to or higher than a predetermined percentage.

* * * * *